March 22, 1966 W. N. LAMPHIER 3,242,313
ELECTRODE TYPE VAPOR GENERATOR
Filed Aug. 27, 1963

INVENTOR
WILBUR N. LAMPHIER
BY
ATTORNEYS

United States Patent Office 3,242,313
Patented Mar. 22, 1966

3,242,313
ELECTRODE TYPE VAPOR GENERATOR
Wilbur N. Lamphier, 58 Kingsberry Ave., Westwood, N.J.
Filed Aug. 27, 1963, Ser. No. 304,821
1 Claim. (Cl. 219—290)

This invention relates to heat generating units which have for their general purpose the conversion of liquids to their vapor state such as from water to steam.

The heating device which is arranged according to this invention has utility in the heating art. It is contemplated that the device may be used in a steam heating system in which water is admitted to the device, efficiently converted to steam thereby and thence passed to a steam heat source in the system.

In the present case the efficiency of conversion is largely determined by the fact that the vapor generator provides restricted zones for passage of the electrically conducting liquid and steam therethrough, the zones being defined solely by non-metallic electrodes between which current through the electrically conducting liquid and steam passes. The electrodes are formed and arranged in such a way as to provide maximum contact with the liquid and short distance for current travel. Efficiency of the generator is attested by the fact that the liquid is vaporized as it first enters the unit, permitting the resulting vapor as a conducting medium to be super-heated as it travels through the unit.

One object of this invention is to provide a vapor generator which is of simple and low cost construction.

Another object of the invention is to provide a vapor generator which operates with a high degree of efficiency.

Other objects and advantages of the invention may be appreciated on reading the following description of one embodiment thereof which is taken in conjunction with the accompanying drawings, in which.

Figure 1:
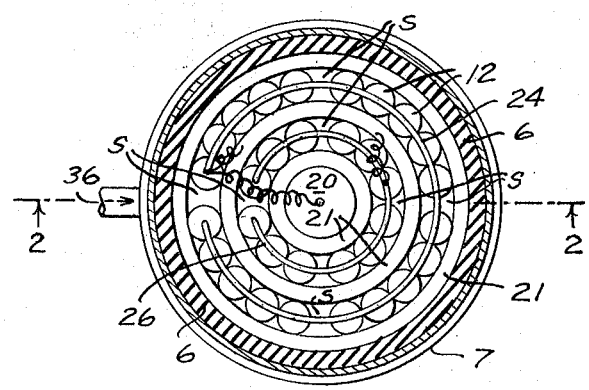
FIGURE 1 is a section in plan of the vapor generator taken on the line 1—1 of FIGURE 2.
Figure 2:
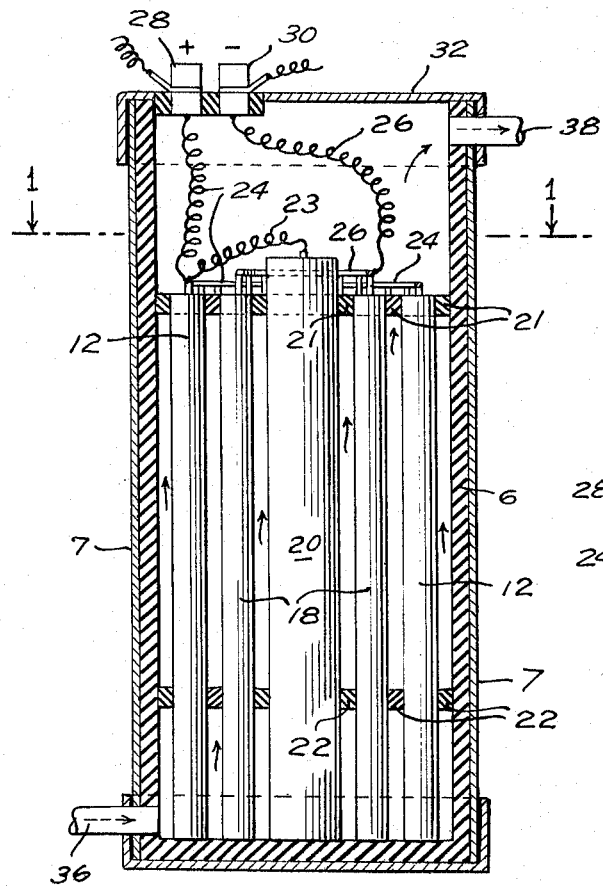
FIGURE 2 is a section taken on the line 2—2 of FIGURE 1.

Referring to the drawings, the electrical generator device is disposed in an inner shell 6 open at the top and fabricated on an insulation material such as bakelite, plastic or vulcanized rubber. The shell 6 is housed within a metal container 7 having a bottom closure which is sweated to the container 7 to make a pressure tight seal. Electrodes 12 are made of carbon or graphite and are circular in cross section being annularly arranged about the inner periphery of the housing. The electrodes are arranged in groups with each group occupying substantially a ninety degree sector and having a space S between groups.

The plus electrodes 12 are radially spaced from minus electrodes 18 which are also annularly arranged between the plus electrodes and the center of the housing in a similar manner to that of the electrodes 12.

Figure 3:
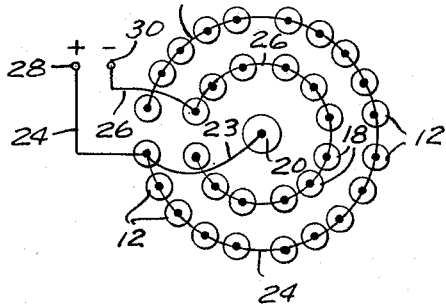
FIGURE 3 is a wiring diagram for the electrodes.

At the axial center of the housing is another plus electrode 20 connected by conductor 23 to conductor 24, the latter serving to connect in parallel all of the plus electrodes in the outer group. See FIGURE 3. Conductor 26 connects the minus electrodes in parallel, and the conductor 24 and the conductor 26 are in turn connected to terminal posts 28 and 30, respectively, molded into the body of cover 32 for the housing. The terminals are connected across a source (not shown). The cover 32 is secured to the container by sweating so as to form a pressure tight seal at the top end. The top of the electrodes are spaced from each other and the shell by spacer rings 21; spacer rings 22 disposed between electrodes proximate the bottom thereof also maintain the desired spacing between the elements and, in addition serve to restrict the vapor flow for more uniform distribution of the vapor as it flows through the vessel.

A tubular inlet 36 is provided at the bottom end of the housing and is adapted to receive the condensate. There is formed in the top portion of the housing a tube 38 which provides a vapor outlet adapted to be connected by suitable piping with the article to be heated. It is apparent that in operation the return condensate will enter the inlet 36 and become again vaporized as it enters the constricted passages formed by the polarized electrodes. Further heating is then permitted to take place as the vapor passes to the top of the housing. The superheated vapor will then pass through the outlet 38 and become converted to a condensate for recirculation in the heating system of which the generator is a component.

It is understood that persons skilled in the art may modify the specific embodiment of invention described above without departing from the scope and principle of invention as defined in the appended claim.

What is claimed is:

A vapor generator comprising a closed container having a cylindrical wall and having a vapor outlet at one end and a liquid inlet at the other end thereof, a vapor generating unit disposed within said container comprising one group of annularly arranged electrodes proximate the cylindrical wall, a second group of annularly arranged electrodes spaced from and disposed concentrically within said one group of electrodes, a central electrode concentric with said second group of electrodes and located in the axial center of said container and electrically connected to one of said groups of electrodes, a voltage source, the electrodes of each group being electrically connected together in parallel and to said voltage source, a first group of electrically insulative electrode spacer rings positioned proximate the bottom of the container above the liquid inlet, a second group of electrically insulative electrode spacer rings positioned proximate the top of the container below the vapor outlet, each of said first and second group of spacer rings comprising a first spacer ring positioned between the cylindrical wall and said one group of electrodes, a second spacer ring positioned between said one group of electrodes and said second group of electrodes and a third spacer ring positioned between said second group of electrodes and said central electrode, said second group of spacer rings restricting the flow of vapor to the vapor outlet, each of said electrodes being circular in cross section.

References Cited by the Examiner

UNITED STATES PATENTS

| | | | |
|---|---|---|---|
| 2,748,253 | 5/1956 | Bremer | 219—295 X |
| 2,757,272 | 7/1956 | Santoni | 219—291 X |

FOREIGN PATENTS

| | | |
|---|---|---|
| 283,544 | 5/1929 | Great Britain. |
| 617,877 | 2/1949 | Great Britain. |
| 56,548 | 5/1936 | Norway. |
| 40,127 | 2/1916 | Sweden. |

RICHARD M. WOOD, *Primary Examiner.*

ANTHONY BARTIS, *Examiner.*